(12) United States Patent
Jin et al.

(10) Patent No.: US 8,438,034 B2
(45) Date of Patent: May 7, 2013

(54) METHOD AND APPARATUS FOR PLAYING PICTURES

(75) Inventors: Sheng Jin, Shanghai (CN); Xin Chen, Shanghi (CN); Yang Peng, Shanghai (CN); Ningjiang Chen, Shanghi (CN); Yunji Xia, Shanghai (CN)

(73) Assignee: Koninklijke Philips Electronics N.V., Eindhoven (NL)

(*) Notice: Subject to any disclaimer, the term of this patent is extended or adjusted under 35 U.S.C. 154(b) by 208 days.

(21) Appl. No.: 12/808,389

(22) PCT Filed: Dec. 11, 2008

(86) PCT No.: PCT/IB2008/055219
§ 371 (c)(1),
(2), (4) Date: Jun. 16, 2010

(87) PCT Pub. No.: WO2009/083845
PCT Pub. Date: Jul. 9, 2009

(65) Prior Publication Data
US 2010/0312559 A1    Dec. 9, 2010

(30) Foreign Application Priority Data
Dec. 21, 2007 (CN) .......................... 2007 1 0162187

(51) Int. Cl.
*G10L 11/00* (2006.01)
*G10L 21/00* (2006.01)

(52) U.S. Cl.
USPC ......... 704/270; 704/275; 348/231.4; 707/915

(58) Field of Classification Search ................ 704/231, 704/235, 251, 270, 275; 348/231.4, 231.5; 707/915
See application file for complete search history.

(56) References Cited

U.S. PATENT DOCUMENTS

| | | | | |
|---|---|---|---|---|
| 5,734,794 A * | 3/1998 | White | ............ | 704/275 |
| 5,826,234 A * | 10/1998 | Lyberg | ............ | 704/277 |
| 6,084,582 A * | 7/2000 | Qureshi et al. | ............ | 715/243 |
| 6,499,016 B1 * | 12/2002 | Anderson | ............ | 704/275 |
| 6,721,001 B1 * | 4/2004 | Berstis | ............ | 348/231.3 |
| 7,127,127 B2 * | 10/2006 | Jojic et al. | ............ | 382/305 |
| 7,133,535 B2 * | 11/2006 | Huang et al. | ............ | 382/100 |
| 7,248,857 B1 | 7/2007 | Richardson | | |
| 7,349,010 B2 * | 3/2008 | Bryant et al. | ............ | 348/207.1 |

(Continued)

FOREIGN PATENT DOCUMENTS

| | | |
|---|---|---|
| EP | 0751658 A2 | 1/1997 |
| GB | 2383247 A1 | 6/2003 |
| JP | 09288681 A1 | 11/1997 |
| JP | 2000358205 A1 | 12/2000 |

OTHER PUBLICATIONS

Shamma, David A. et al "MusicStory: A Personalized Music Video Creator" Proceedings of the ACM International Conference on Multimedia, NY, Nov. 11, 2005.

(Continued)

*Primary Examiner* — James Wozniak

(57) ABSTRACT

A method of playing pictures includes receiving a voice message; extracting a key feature from the voice message; selecting pictures by matching the key feature with pre-stored picture information; generating a picture-voice sequence by integrating the selected pictures and the voice message; and playing the picture-voice sequence. An electronic apparatus includes a processing unit for implementing the method.

18 Claims, 2 Drawing Sheets

U.S. PATENT DOCUMENTS

| | | | | |
|---|---|---|---|---|
| 7,412,389 | B2 * | 8/2008 | Yang | 704/260 |
| 7,433,490 | B2 * | 10/2008 | Huang et al. | 382/100 |
| 7,613,613 | B2 * | 11/2009 | Fields et al. | 704/272 |
| 7,711,560 | B2 * | 5/2010 | Yamada et al. | 704/255 |
| 7,721,301 | B2 * | 5/2010 | Wong et al. | 719/322 |
| 7,738,637 | B2 * | 6/2010 | Schmandt et al. | 379/88.17 |
| 8,015,009 | B2 * | 9/2011 | Harband et al. | 704/260 |
| 8,077,179 | B2 * | 12/2011 | Ludwigsen | 345/473 |
| 2002/0040298 | A1 | 4/2002 | Loudermilk | |
| 2002/0085022 | A1 | 7/2002 | Masuda | |
| 2002/0099552 | A1 * | 7/2002 | Rubin et al. | 704/270 |
| 2003/0063321 | A1 * | 4/2003 | Inoue et al. | 358/302 |
| 2003/0124502 | A1 * | 7/2003 | Chou | 434/350 |
| 2004/0120554 | A1 * | 6/2004 | Lin et al. | 382/118 |
| 2005/0057578 | A1 | 3/2005 | Chen | |
| 2005/0256712 | A1 * | 11/2005 | Yamada et al. | 704/255 |
| 2005/0273331 | A1 * | 12/2005 | Lu | 704/246 |
| 2006/0195445 | A1 * | 8/2006 | Julia et al. | 707/6 |
| 2007/0263266 | A1 * | 11/2007 | Har'el et al. | 358/527 |
| 2009/0073176 | A1 * | 3/2009 | Pirchio | 345/501 |
| 2011/0289073 | A1 * | 11/2011 | Dow et al. | 707/722 |

OTHER PUBLICATIONS

Cai, Rui et al "Automated Music Video Generation Using WEB Image Resource", IEEE International Conference on Acoustics, Speech and Signal Processing, Apr. 20, 2007, vol. 2, pp. II-737.

Ludovik, Ye et al "Intelligent Answering Machine Secretary" 4th European Conference on Speech Communication and Technology, Sep. 18, 1995, vol. 1, pp. 277-280.

Anonymous: "Fonawy Standard" Mewsoft Product Information (online), May 20, 2007.

* cited by examiner

METHOD AND APPARATUS FOR PLAYING PICTURES

FIELD OF THE INVENTION

The invention relates to a method and apparatus for playing pictures.

BACKGROUND OF THE INVENTION

More and more electronic apparatuses are used for playing pictures, e.g. PDAs (Personal Digital Assistants), mobile phones, TVs (Televisions), PCs (personal computers), digital photo frames, etc. Electronic apparatuses used for playing pictures can store, manage, and share pictures. They can also play slideshows of digital pictures, which are stored in their internal memory, or external memory cards, on a built-in display screen. The pictures may be photos, images, graphics, etc.

It is possible to just simply play a slideshow of stored digital pictures on most current electronic apparatuses. However, a user may demand more functions to accompany the slideshow so as to increase interactivity between the user and the electronic apparatus. To improve interactivity between an electronic apparatus and a user, a known electronic apparatus, which is a device for classifying pictures by voice recording and via a storage medium, is disclosed in Japanese patent application JP200058205A. The device comprises pre-stored voice data and picture data, recognition means for recognizing voice data which accompanies picture data, classification means for classifying the picture data based on the pre-stored voice data recognized by the recognition means, and searching means for searching pictures or picture categories by means of input voice data which is similar to the pre-stored voice data.

However, the known electronic apparatus only interacts with a user on the basis of a pre-defined and fixed voice, which makes a user interface unintelligent and not user-friendly, and does not sufficiently improve interactivity between the user and the electronic apparatus.

OBJECT AND SUMMARY OF THE INVENTION

It is an object of the invention to provide an improved method and apparatus for playing pictures.
The method of playing pictures comprises the steps of:
receiving a voice message,
extracting a key feature from the voice message,
selecting pictures by matching the key feature with pre-stored picture information,
generating a picture-voice sequence by integrating the selected pictures and the voice message, and
playing the picture-voice sequence.

The invention also provides an electronic apparatus comprising a processing unit for implementing the different steps of the method according to the invention.

In this method and apparatus, the voice message randomly input by a user and corresponding pictures relating to the voice message are integrated in a picture-voice playing sequence, which improves interactivity between the user and the electronic apparatus.

BRIEF DESCRIPTION OF THE DRAWINGS

These and other aspects of the method and apparatus for playing pictures according to the invention are apparent from and will be elucidated with respect to the implementations and embodiments described hereinafter with reference to the accompanying drawings, wherein.

Identical reference numerals are used to denote similar parts throughout the Figures.

DESCRIPTION OF EMBODIMENTS

Figure 1:
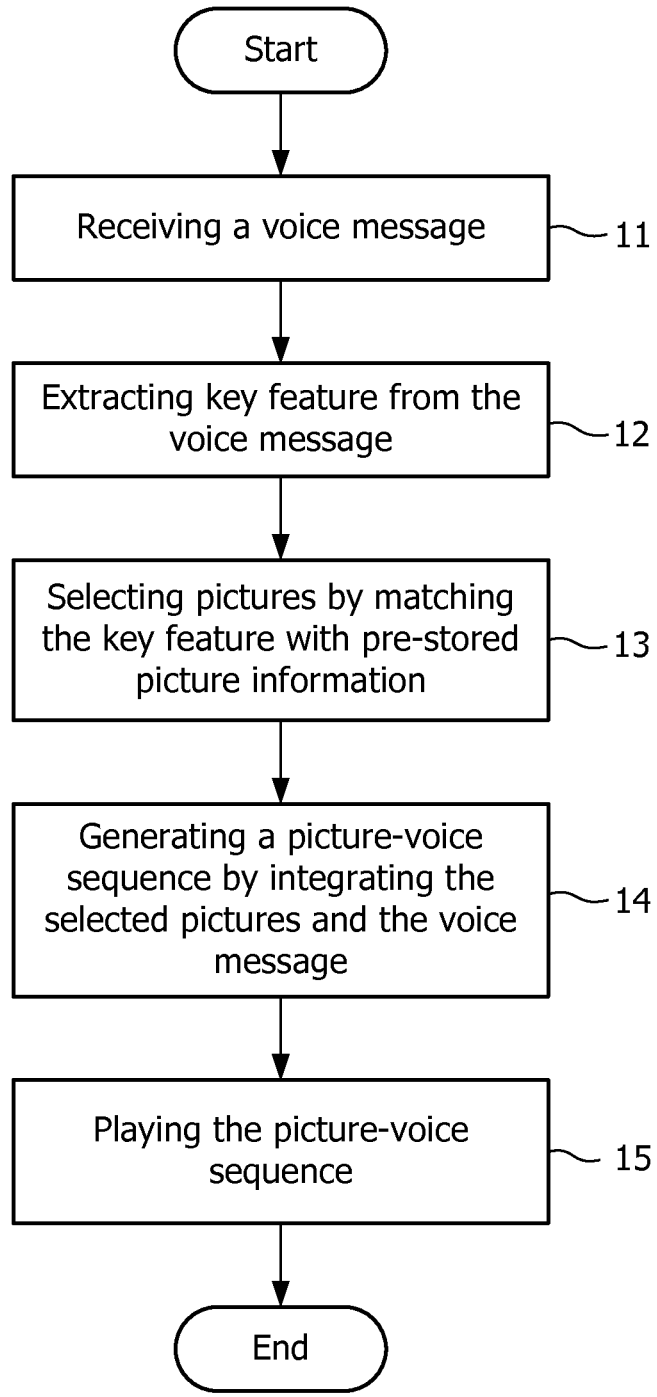
FIG. 1 is a method flow chart of an embodiment according to the invention.

FIG. 1 is a method flow chart of an embodiment according to the invention.

The method of playing pictures comprises the steps of:
receiving (11) a voice message. The voice message is received from a user or a second electronic apparatus which may be a PDA (Personal Digital Assistant), a mobile phone, a TV (Television), a PC (personal computer), a digital photo frame, etc. The content of the voice message can be randomly decided by a user. The voice message may consist of words, sentences, music, etc. The receiving step (11) may be intended to record the voice message and store it in a memory of a first electronic apparatus. For example, when a son comes back from school, he may want to leave a voice message, such as "I am going to play basketball and will be back at 7 pm", to his mother through the first electronic apparatus. The first electronic apparatus may also be a PDA (Personal Digital Assistant), a mobile phone, a TV (Television), a PC (personal computer), a digital photo frame, etc.

extracting (12) a key feature from the voice message. The extracting step (12) is intended to analyse the voice message content word by word so as to extract the key feature, such as a key word, and/or user identification, and/or corresponding intonation. The intonation can be pre-classified in different categories, such as "happy", "sad", "neutral", and stored in the memory of the first electronic apparatus. For example, the key word may be "basketball", the intonation may be "happy", and the user identification is "son". The extracting step (12) is further intended to calculate a playtime for the voice message, e.g. after calculation, the duration of playing the voice message is one minute.

selecting (13) pictures by matching the key feature with pre-stored picture information. The pre-stored picture information is stored in the memory of the first electronic apparatus. The pre-stored picture information may include a picture name, a short description of the picture content, etc. For example, the pictures which relate to "basketball", "happy", and "son" are selected because they match with the key feature of the voice message. A match weight may be pre-defined in the memory, so that the selected pictures can be classified in, for example, four levels. The match weight is 100 for the first level, which means that the selected pictures included in the first level are very relevant to the voice message; 60 for the second level; 20 for the third level; and 0 for the fourth level. The pictures of level 1 have the highest priority to be played, followed by the pictures of levels 2, 3, and 4, in that order.

generating (14) a picture-voice sequence by integrating the selected pictures and the voice message. The generating step (14) is intended to generate a picture-voice sequence in accordance with the key feature of the voice message, the duration of the voice message, and the pre-stored picture information. The generating step (14)

is further intended to determine a playtime for the picture-voice sequence, a playing order for the selected pictures, and a playtime for each selected picture. The playtime of the picture-voice sequence may be equal to the duration of the voice message. The playing order for the selected pictures can be determined in accordance with their match weight. For example, if the match weight is higher, the corresponding selected pictures can be played at an earlier point of time; if the match weight is lower, the corresponding selected pictures can be played at a later point of time. The playtime of each selected picture can also be determined in accordance with its match weight. For example, if the match weight is higher, the corresponding pictures can be played for a longer time; if the match weight is lower, the corresponding pictures can be played for a shorter time. Of course, each selected picture being played may have the same playtime length. If the voice message has a playtime of one minute, the playtime of the picture-voice sequence may also be one minute. Consequently, if, for example, six pictures are selected and each selected picture is to be played with the same playtime length, each selected picture will have a playtime of ten seconds.

playing (15) the picture-voice sequence. The playing step (15) may comprise three situations: the first is playing the picture-voice sequence immediately after generating this picture-voice sequence; the second is playing the picture-voice sequence circularly, until playing is discontinued; and the third is playing the picture-voice sequence in accordance with a user's instructions. In the third situation, a user can instruct the first electronic apparatus to play the picture-voice sequence, when he notices a reminding flash light (e.g. a LED) or other alert shown on the electronic apparatus) for the picture-voice sequence. Before a user gives the instruction to play the picture-voice sequence, it can be stored in the memory of the first electronic apparatus. For example, when the mother comes back, she notices a flash light on the electronic apparatus, such as a photo frame, which reminds her that some family member has left a voice message, and then she can push a button on the photo frame so as to browse the picture-voice sequence. In all of the three situations mentioned above, the picture-voice sequence can be automatically stored in the memory after this sequence has been played. If more than one picture-voice sequence is generated, the playing step (15) may be intended to play the picture-voice sequences in a certain order in accordance with the generating time of each picture-voice sequence.

Figure 2:
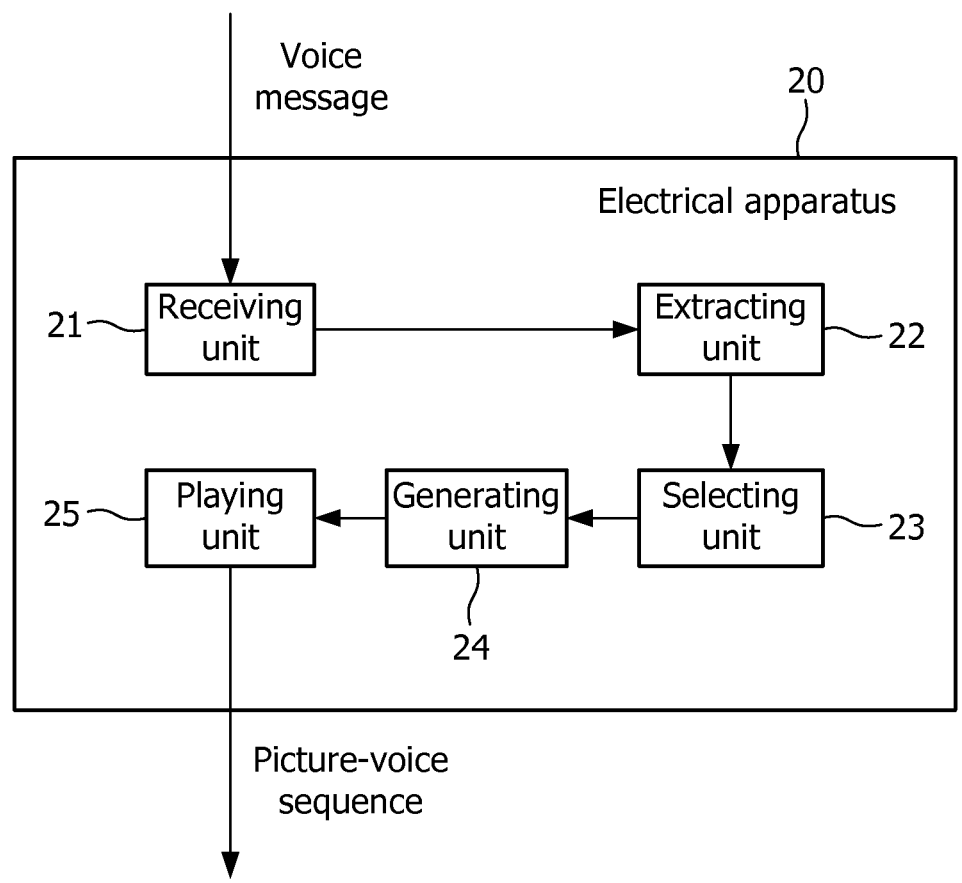
FIG. 2 is a schematic diagram depicting an apparatus of an embodiment according to the invention.

FIG. 2 is a schematic diagram depicting an apparatus of an embodiment according to the invention. The electronic apparatus 20 may be a PDA (Personal Digital Assistant), a mobile phone, a TV (Television), a PC (personal computer), a digital photo frame, etc.

The electronic apparatus 20 for playing pictures comprises:

a receiving unit (21) for receiving a voice message. The voice message is received from a user or another electronic apparatus which may be a PDA (Personal Digital Assistant), a mobile phone, a TV (Television), a PC (personal computer), a digital photo frame, etc. The content of the voice message can be randomly decided by a user. The voice message may consist of words, sentences, music, etc. The receiving unit (21) is used to record the voice message and store it in a memory. The receiving unit (21) may be a wireless unit, a recorder, etc.

an extracting unit (22) for extracting a key feature from the voice message. The extracting unit (22) is used to analyse the voice message content word by word so as to extract the key feature, such as a key word, user identification, and corresponding intonation. The intonation may be pre-classified in different categories, such as "happy", "sad", "neutral", and the pre-classified intonation criteria can be stored in the memory of the electronic apparatus 20. The extracting unit (22) is further used to calculate a playtime for the voice message.

a selecting unit (23) for selecting pictures by matching the key feature with pre-stored picture information. The pre-stored picture information is stored in the memory of the electronic apparatus 20. The picture information may include a picture name, a short description of the picture content, etc. A match weight may be pre-defined in the memory, so that the selected pictures can be classified in, for example, four levels. The match weight is 100 for the first level, which means that the selected pictures included in the first level are very relevant to the voice message; 60 for the second level; 20 for the third level; and 0 for the fourth level. The pictures of level 1 have the highest priority to be played, followed by the pictures of levels 2, 3, and 4, in that order.

a generating unit (24) for generating a picture-voice sequence by integrating the selected pictures and the voice message. The generating unit (24) is used to generate a picture-voice sequence in accordance with the key feature of the voice message, its duration, and the pre-stored picture information. The generating unit (24) is further used to determine a playtime for the picture-voice sequence, a playing order for the selected pictures, and a playtime for each selected picture. The playtime of the picture-voice sequence may be equal to the duration of the voice message. The playing order of the selected pictures can be determined by the generating unit (24) in accordance with the match weight. The playtime of each selected picture can also be determined by the generating unit (24) in accordance with the match weight. Of course, each selected picture being played may have the same playtime length.

a playing unit (25) for playing the picture-voice sequence. The playing unit (25) is used to play the picture-voice sequence in the following three situations: the first is playing the picture-voice sequence immediately after generating this picture-voice sequence; the second is playing the picture-voice sequence circularly, until playing is discontinued; and the third is playing the picture-voice sequence in accordance with a user's instructions. In the third situation, a user can instruct the first electronic apparatus to play the picture-voice sequence, when he notices a reminding flash light (e.g. a LED) or other alert shown on the electronic apparatus for the picture-voice sequence. Before a user gives the instruction to play the picture-voice sequence, it can be stored in the memory. In all of the three situations mentioned above, the picture-voice sequence can be automatically stored in the memory after this sequence has been played. If more than one picture-voice sequence is generated, the playing unit (25) may be used to play the picture-voice sequences in a certain order in accordance with the generating time of each picture-voice sequence.

The components of the electronic apparatus 20 are supported by at least one CPU.

It should be noted that the above-mentioned embodiments illustrate rather than limit the invention and that those skilled in the art will be able to design many alternative embodiments without departing from the scope of the appended claims. In the claims, any reference sign placed between parentheses shall not be construed as limiting the claim. Use of the verb 'comprise' and its conjugations does not exclude the presence of elements or steps other than those stated in a claim. Use of the indefinite article "a" or "an" preceding an element does not exclude the presence of a plurality of such elements. The invention can be implemented by means of hardware comprising several distinct elements and by means of a suitable programmed computer. In the unit claims enumerating several means, several of these means may be embodied by one and the same item of hardware. Use of the words first, second and third, etc. does not indicate any ordering. These words are to be interpreted as names.

The invention claimed is:

1. A method of playing pictures, the method comprising the acts of:
   receiving, using a receiving unit, a voice message, said receiving unit recording and storing the received voice message;
   extracting, using an extracting unit, a key feature from the voice message, said key feature including at least one of (1) a key word, (2) a user identification, and (3) an intonation of the voice message;
   selecting, using a selecting unit, one or more pictures from a plurality of pre-stored pictures by matching the extracted key feature with pre-stored picture information associated with each of said plurality of pre-stored pictures;
   generating, using a generating unit, a picture-voice sequence by integrating the selected pictures and the voice message; and
   playing, using a playing unit, the picture-voice sequence,
   wherein a playing order for the selected one or more pictures is determined in accordance with a pre-defined match weigh such that a first selected picture having a higher weight that more closely matches the extracted key feature is played before a second selected picture having a lower weight that less closely matches the extracted key feature than the first selected picture.

2. The method as claimed in claim 1, wherein the extracting act analyzes the voice message content word-by-word so as to extract the key feature.

3. The method as claimed in claim 1, wherein the extracting act calculates a playtime for the voice message.

4. The method as claimed in claim 3, wherein the pre-stored picture information comprises a picture name, and a short description of the picture content.

5. The method as claimed in claim 4, wherein the generating act generates a picture-voice sequence in accordance with the key feature of the voice message, the duration of the voice message, and the pre-stored picture information.

6. The method as claimed in claim 1, wherein the generating act further determines a playtime for the picture-voice sequence, the playing order for the selected pictures, and a playtime for each selected picture.

7. The method as claimed in claim 6, wherein the playtime of the picture-voice sequence equals the duration of the voice message.

8. The method as claimed in claim 6, wherein the playtime of each selected picture is determined in accordance with a pre-defined match weight so that the first selected picture having the higher weight is played for a longer duration that the second selected picture having the lower weight.

9. The method as claimed in claim 1, wherein each selected picture being played has a same playtime length.

10. An electronic apparatus for playing pictures, the electronic apparatus comprising:
    a receiving unit for receiving a voice message, said receiving unit recording and storing said voice message;
    an extracting unit for extracting a key feature from the voice message, said key feature including at least one of (1) a key word, (2) a user identification, and (3) an intonation of the voice message;
    a selecting unit for selecting one or more pictures from a plurality of pre-stored pictures by matching the key feature with pre-stored picture information associated with each of said plurality of pre-stored pictures;
    a generating unit for generating a picture-voice sequence by integrating the selected pictures and the voice message; and
    a playing unit for playing the picture-voice sequence,
    wherein a playing order for the selected one or more pictures is determined in accordance with a pre-defined match weigh such that a first selected picture having a higher weight that more closely matches the extracted key feature is played before a second selected picture having a lower weight that less closely matches the extracted key feature than the first selected picture.

11. The electronic apparatus as claimed in claim 10, wherein the extracting unit analyzes the voice message content word-by-word so as to extract the key feature.

12. The electronic apparatus as claimed in claim 10, wherein the extracting unit further calculates a playtime for the voice message.

13. The electronic apparatus as claimed in claim 12, wherein the pre-stored picture information comprises a picture name, and a short description of the picture content.

14. The electronic apparatus as claimed in claim 13, wherein the generating unit generates a picture-voice sequence in accordance with the key feature of the voice message, the playtime of the voice message, and the pre-stored picture information.

15. The electronic apparatus as claimed in claim 10, wherein the generating unit further determines a playtime for the picture-voice sequence, the playing order for the selected pictures, and a playtime for each selected picture.

16. The electronic apparatus as claimed in claim 15, wherein the playtime of the picture-voice sequence equals the playtime of the voice message.

17. The electronic apparatus as claimed in claim 15, wherein the generating unit determines the playtime of each selected picture in accordance with a pre-defined match weight so that the first selected picture having the higher weight is played for a longer duration that the second selected picture having the lower weight.

18. The electronic apparatus as claimed in claim 10, wherein each selected picture being played has a same playtime length.

* * * * *